United States Patent
Wada (10) Patent No.: US 6,311,481 B1
(45) Date of Patent: Nov. 6, 2001

(54) CATALYST DETERIORATION DETECTING APPARATUS FOR INTERNAL COMBUSTION ENGINE

(75) Inventor: Shuichi Wada, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/552,246

(22) Filed: Apr. 19, 2000

(30) Foreign Application Priority Data

Oct. 26, 1999 (JP) .................................................. 11-303733

(51) Int. Cl.[7] ...................................................... F01N 3/00
(52) U.S. Cl. ................................. 60/277; 60/274; 60/285
(58) Field of Search ............................... 60/277, 285, 274

(56) References Cited

U.S. PATENT DOCUMENTS

| 5,359,852 | * | 11/1994 | Curran et al. ......................... 60/285 |
| 5,579,637 | * | 12/1996 | Yamashita et al. .................... 60/285 |
| 5,966,930 | * | 10/1999 | Hatano et al. ......................... 60/276 |
| 6,185,929 | * | 2/2001 | Ishizuka et al. ....................... 60/285 |

FOREIGN PATENT DOCUMENTS 5-98949   4/1993 (JP) ................................ F01N/3/20

* cited by examiner

Primary Examiner—Thomas Denion
Assistant Examiner—Diem Tran
(74) Attorney, Agent, or Firm—Sughrue, Mion, Zinn, Macpeak & Seas, PLLC (57) ABSTRACT

An apparatus for detecting deterioration of a catalyst (4) for an internal combustion engine which can ensure high reliability for the decision as to deterioration of the catalyst by preventing positively erroneous determination of the deteriorated state of the catalyst due to variations of operating state. The apparatus includes first and second air-fuel ratio sensors (5, 6) provided upstream and downstream of the catalyst (4), respectively, a deterioration parameter arithmetic means (11) for arithmetically determining a deterioration parameter (P) for decision as to deterioration of the catalyst (4) on the basis of comparison between first and second detection signals (D1, D2) of the first and second air-fuel ratio sensors (5, 6), respectively, an event frequency counting means (14) for counting occurrences of the deterioration parameter (P) in each of plural distribution fields prepared in dependence on magnitudes of arithmetically determined values of the deterioration parameter (P) as event frequency count data (N1 to N10), respectively, a statistic value arithmetic means (15) for arithmetically determining a statistic value (Q) on the basis of the event frequency count data (N1 to N10) registered in the distribution fields, and a catalyst deterioration decision means (13A) for deciding whether the catalyst (4) is deteriorated or not on the basis of the statistic value (Q).

10 Claims, 6 Drawing Sheets

FIG. 2

| EVENT FREQUENCY COUNT DATA (FIELD) | N1 | N2 | N3 | N4 | N5 | N6 | N7 | N8 | N9 | N10 |
|---|---|---|---|---|---|---|---|---|---|---|
| PARAMETER ARITHMETIC VALUE P[%] | 0~10 | 10~20 | 20~30 | 30~40 | 40~50 | 50~60 | 60~70 | 70~80 | 80~90 | 90~100 |

CATALYST DETERIORATION DETECTING APPARATUS FOR INTERNAL COMBUSTION ENGINE

BACKGROUND OF THE INVENTION

1. Field of the Invention

The present invention generally relates to an apparatus for detecting deterioration of a three way catalytic converter (hereinafter also referred to simply as the catalyst) disposed in an exhaust pipe of an internal combustion engine system on the basis of air-fuel ratios detected at locations upstream and downstream, respectively, of the catalytic converter within the exhaust pipe. More particularly, the present invention is concerned with the catalyst deterioration detecting apparatus for an internal combustion engine which apparatus is improved such that erroneous detection of deteriorated state of the catalyst ascribable to variations of the operation state thereof such as variations of the environmental conditions can be suppressed and thus high reliability can be ensured for the detection or decision as to deterioration of the catalyst. Furthermore, the present invention is concerned with a catalyst deterioration detecting method which can ensure significantly enhanced reliability and a recording medium which stores the deterioration detecting method in the form of a program or programs executable with a computer such as a microcomputer.

2. Description of Related Art

In general, in the fuel injection control system for the internal combustion engine of a motor vehicle or car, it is known to control the fuel injection quantity on the basis of a basic fuel injection quantity which is arithmetically determined in dependence on operation state parameters of the engine such as intake-air quantity, engine rotation number (rpm) and/or the like and which is correctively modified on the basis of detection signal(s) outputted from at least one air-fuel ratio sensor such as an $O_2$-sensor disposed in the exhaust pipe for detecting concentration of oxygen contained in the exhaust gas so that the air-fuel ratio can ultimately converge to a desired or stoichiometric value.

By controlling the fuel injection quantity such that the stoichiometric air-fuel ratio can be realized in operation of the internal combustion engine, the purifying capability of the three way catalytic converter can be sustained at a high level and thus CO (carbon monoxide), $NO_x$ (nitrogen oxides) and HC (hydrocarbon) can be converted to harmless components through oxidation-reduction reaction.

Further, there have heretofore been proposed and developed for practical application a variety of schemes for detecting deterioration of the catalyst or deteriorated state by making use of the detection signals outputted from a pair of air-fuel ratio sensors disposed within the exhaust pipe at locations upstream and downstream, respectively, of the three way catalytic converter, as is described, for example, in Japanese Unexamined Patent Application Publication No. 98949/1993 (now matured to Japanese Patent No. 2611070).

For better understanding of the present invention, description will first be made of the conventional catalyst deterioration detecting apparatus known heretofore.

Figure 6:
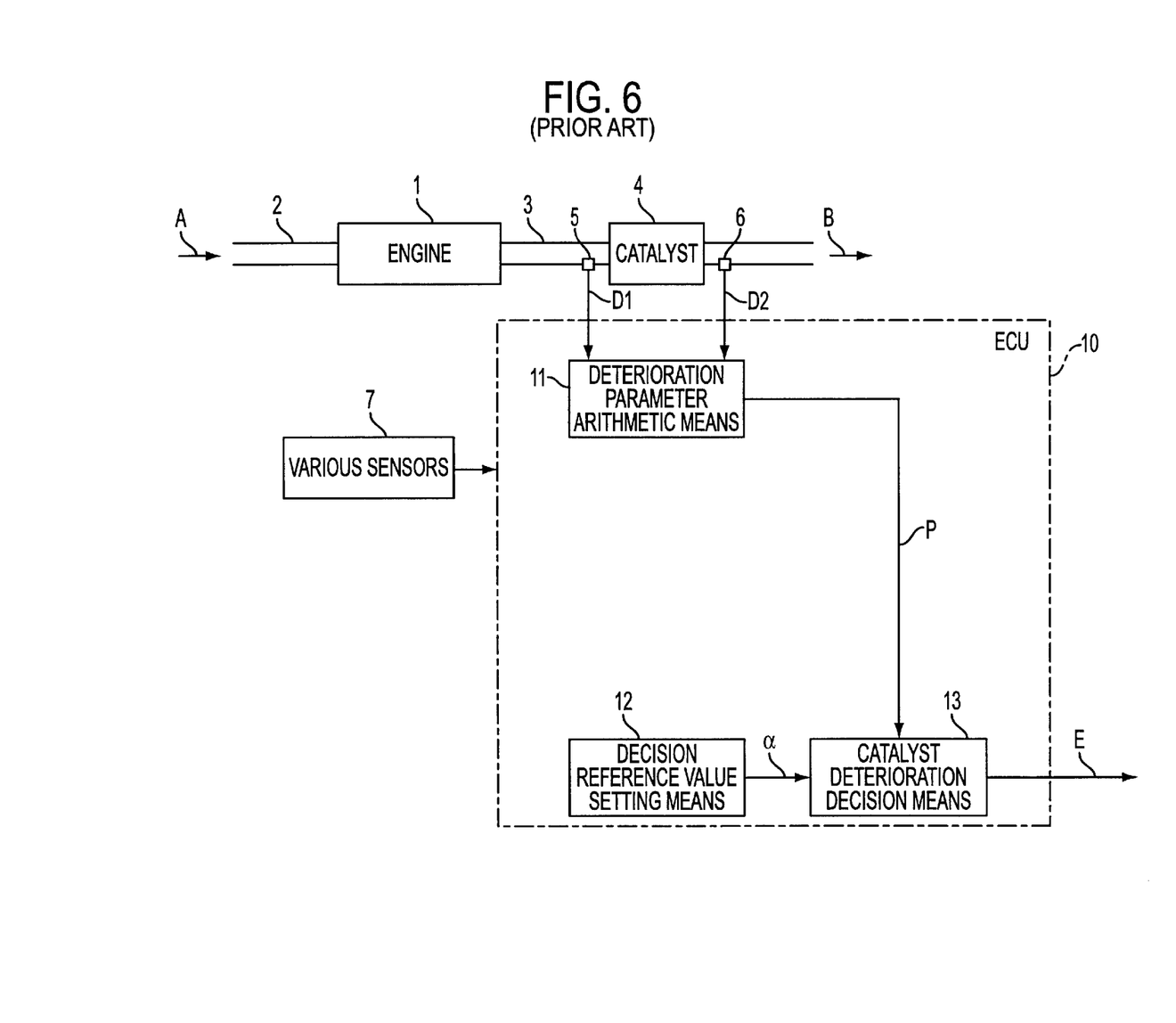
FIG. 6 is a block diagram showing generally an arrangement of a conventional catalyst deterioration detecting apparatus for an internal combustion engine.

FIG. 6 is a block diagram showing generally an arrangement of a conventional catalyst deterioration detecting apparatus for an internal combustion engine which is designed to detect deterioration of the catalyst on the basis of air-fuel ratio detection signals obtained at upstream and downstream sides of the catalyst, respectively.

Referring to the figure, an engine 1 which constitutes a main part of the internal combustion engine system is provided with an intake pipe 2 and an exhaust pipe 3 in an arrangement known per se in the art.

The intake pipe 2 is provided with a fuel injector (not shown) for charging an air-fuel mixture A containing the fuel as injected into the engine 1 from the intake pipe 2. The exhaust gas B resulting from combustion of the air-fuel mixture in the engine 1 is discharged through the exhaust pipe 3.

A three way catalytic converter 4 for purifying the exhaust gas B is disposed in the exhaust pipe 3. Ordinarily, the catalytic converter 4 is disposed at a bottom plane of the car body together with the exhaust pipe 3.

Installed on the exhaust pipe 3 are a pair of air-fuel ratio sensors 5 and 6 at positions upstream and downstream of the catalytic converter 4, respectively. Detection signals outputted from the air-fuel ratio sensors 5 and 6 are designated by reference characters D1 and D2, respectively.

For the purpose of monitoring or detecting operation states of the engine 1, various types of sensors denoted collectively by reference numeral 7 are provided. As the sensors 7, there may be mentioned typically a crank angle sensor, an engine rotation number sensor, a temperature sensor, a throttle opening degree sensor and an intake-air quantity sensor all of which are known in the art. Thus, information indicative of operation states of the engine 1 can be obtained on the basis of the output signals of the various sensors mentioned above.

An ECU (Electronic Control Unit) 10 which may be constituted by a microcomputer is composed of a deterioration parameter arithmetic means 11, a decision reference value setting means 12 and a catalyst deterioration decision means 13 in addition to a fuel injection control means and an ignition control means (not shown) which are known in the art. The ECU 10 receives as inputs thereto the air-fuel ratio detection signals D1 and D2 and the detection information derived from the outputs of the various sensors 7. Parenthetically, the various means mentioned just above can be realized in the form of program(s) which is executable with a computer.

The deterioration parameter arithmetic means 11 is so designed or programmed as to arithmetically determine a deterioration parameter P for making decision as to degree of deterioration of the catalyst on the basis of the result of comparison of the air-fuel ratio detection signals D1 and D2.

More specifically, the deterioration parameter arithmetic means 11 may be designed to determine arithmetically at least one of the number of polarity inversions and the waveform areas (integral values) of the detection signals D1 and D2 as the basic values, respectively, and then determine arithmetically the ratio between the basic values as the deterioration parameter P (arithmetically determined value) indicating the degree of deterioration of the catalyst.

The decision reference value setting means 12 is so designed or programmed as to set a decision reference value a serving as the comparison reference value for the deterioration parameter P.

The catalyst deterioration decision means 13 is designed or programmed to compare the deterioration parameter P with the decision reference value a to thereby generate an abnormality signal E indicative of deteriorated state of the catalyst when the condition that the deterioration parameter P is greater than the decision reference value α, i.e., P>α, is satisfied.

In response to the abnormality signal E, an alarm device (not shown) is actuated to inform the operator or driver of the deteriorated state of the catalyst to prompt him or her exchange of the catalytic converter 4.

Parenthetically, the catalyst deterioration decision means 13 is designed to compare the deterioration parameter P with the reference value α to thereby make decision as to the deteriorated state of the catalyst 4 every time the detection signals D1 and D2 are inputted to the ECU 10.

At this juncture, it should be mentioned that the purifying function or capability of the catalyst is likely to be affected by variation of environmental or operating condition and may temporarily be degraded when the temperature lowers. As mentioned previously, the catalyst 4 is disposed on the bottom plane of the car body. Accordingly, the catalytic converter 4 may be sputtered with water from the puddles on the roads in the course of running the motor vehicle or car to be thereby cooled temporarily. Under the circumstances, there arises such possibility that the catalyst deterioration decision means 13 may make erroneous decision as to the deteriorated state or level of the catalyst due to unexpected factors such as temperature lowering as encountered during operation of the internal combustion engine.

As will now be appreciated from the foregoing, the conventional catalyst deterioration detecting apparatus for the internal combustion engine suffers a problem that the deteriorated state of the catalyst is likely to be erroneously determined when the function of the catalyst becomes temporarily lowered due to e.g. temporal temperature lowering mentioned above, since the deterioration decision processing is executed every time the deterioration parameter is arithmetically determined.

SUMMARY OF THE INVENTION

In the light of the state of the art described above, it is an object of the present invention to provide a catalyst deterioration detecting apparatus for an internal combustion engine which can ensure high reliability for the decision as to deterioration of the catalyst by preventing positively erroneous determination of the deteriorated state of the catalyst due to variations of the operating condition or state.

It is another object of the present invention to provide a catalyst deterioration detecting method which can ensure significantly enhanced reliability.

A further object of the present invention is to provide a recording medium which stores therein the catalyst deterioration detecting method in the form of a program or programs executable with a computer such as a microcomputer.

In view of the above and other objects which will become apparent as the description proceeds, there is provided according to an aspect of the present invention an apparatus for detecting deterioration of a catalyst provided in an exhaust pipe of an internal combustion engine system, which apparatus includes a first air-fuel ratio sensor provided upstream of the catalyst, a second air-fuel ratio sensor provided downstream of the catalyst, a deterioration parameter arithmetic module for arithmetically determining a deterioration parameter for making decision as to deterioration of the catalyst on the basis of comparison between a first detection signal originating in the first air-fuel ratio sensor and a second detection signal originating in the second air-fuel ratio sensor, an event frequency counting module for counting occurrences of the deterioration parameter in each of plural distribution fields prepared in dependence on magnitudes of arithmetically determined values of the deterioration parameter as event frequency count data, respectively, a statistic value arithmetic module for arithmetically determining a statistic value on the basis of the event frequency count data in the distribution fields, and a catalyst deterioration decision module for deciding whether the catalyst is deteriorated or not on the basis of the statistic value.

By virtue of the arrangement described above, there can be realized the catalyst deterioration detecting apparatus which can ensure very high reliability for the detection of deterioration of the catalyst because erroneous decision of deterioration due to variations of operating state can positively be avoided.

In a preferred mode for carrying out the invention, the deterioration parameter arithmetic module may be so designed as to determine arithmetically at least one of the number of polarity inversions and waveform areas of the first and second detection signals as first and second concerned values, respectively, and then determine arithmetically as the arithmetically determined value of the deterioration parameter a value obtained by dividing the second concerned value derived from the second detection signal by the first concerned value derived from the first detection signal.

With the arrangement described above, reliability of the catalyst deterioration decision can further be enhanced.

In another preferred mode for carrying out the invention, the event frequency counting module may be so designed as to divide a whole range of deterioration parameter values extending from a minimum value to a maximum value thereof into a plurality of the distribution fields at a substantially equal interval to thereby count the number of occurrences of the deterioration parameter independently in each of the distribution fields.

In yet another preferred mode for carrying out the invention, the statistic value arithmetic module may be so designed as to divide event frequency count data covering the maximum value as obtained from the event frequency counting module by event frequency count data covering the minimum value to thereby set a value resulting from the division as the statistic value.

In still another preferred mode for carrying out the invention, the catalyst deterioration detecting apparatus for the internal combustion engine system may further include a decision reference value setting module for setting a decision reference value serving as a reference value for comparison with the statistic value, wherein the catalyst deterioration decision module can be so designed as to compare the statistic value with the decision reference value to thereby generate an abnormality signal indicative of deterioration of the catalyst when the statistic value exceeds the decision reference value.

With the arrangement described above, the erroneous decision of deterioration of the catalyst can be suppressed more positively.

In a further preferred mode for carrying out the invention, the event frequency counting module may be so arranged that the event frequency count data can be backed up for thereby holding the frequency distribution data even after power-off of the internal combustion engine system.

With the arrangement described above, the frequency distribution data can be sustained consecutively even when the engine operation is stopped.

In a yet further preferred mode for carrying out the invention, the catalyst deterioration detecting apparatus for the internal combustion engine system may further include an overflow decision module for generating an overflow decision signal when overflow of the event frequency count data occurs in at least one of the distribution fields, and a data compression module for compressing all the event frequency count data in all of the distribution fields in response to the overflow decision signal.

Owing to the arrangement described above, high reliability of the catalyst deterioration decision can be sustained over an extended period.

In a still further preferred mode for carrying out the invention, the data compression module may be so designed as to compress all the event frequency count data in all of the distribution fields to $\frac{1}{2}^N$ (n: a natural number) in response to the overflow decision signal.

With the arrangement described above, the overflow state can be canceled out with very simple processing.

According to another aspect of the present invention, there is provided a method of detecting deterioration of a catalyst provided in an exhaust pipe of an internal combustion engine system, which method includes the steps of detecting a first air-fuel at a location upstream of the catalyst within the exhaust pipe, detecting a second air-fuel ratio at a location downstream of the catalyst within the exhaust pipe, determining arithmetically a deterioration parameter for decision as to deterioration of the catalyst on the basis of comparison between the first air-fuel ratio and the second air-fuel ratio, counting occurrences of the deterioration parameter in each of plural distribution fields prepared in dependence on magnitudes of arithmetically determined values of the deterioration parameter as event frequency count data, respectively, determining arithmetically a statistic value on the basis of the event frequency count data in the distribution fields, and deciding whether the catalyst is deteriorated or not on the basis of the statistic value.

The catalyst deterioration detecting method described above can be carried out automatically with the aid of a computer or microcomputer, to a great advantage.

According to a further aspect of the present invention, there is provided a recording medium storing a method of detecting deterioration of a catalyst provided in an exhaust pipe of an internal combustion engine system in the form of a computer-executable program, which program is comprised of the statements of detecting a first air-fuel at a location upstream of the catalyst within the exhaust pipe, detecting a second air-fuel ratio at a location downstream of the catalyst within the exhaust pipe, determining arithmetically a deterioration parameter for decision as to deterioration of the catalyst on the basis of comparison between the first air-fuel ratio and the second air-fuel ratio, counting occurrences of the deterioration parameter in each of plural distribution fields prepared in dependence on magnitudes of arithmetically determined values of the deterioration parameter as event frequency count data, respectively, determining arithmetically a statistic value on the basis of the event frequency count data in the distribution fields, and deciding whether the catalyst is deteriorated or not on the basis of the statistic value.

Owing to the aspect mentioned just above, the present invention can be implemented, for example, in the form of a memory chip storing the catalyst deterioration detecting method as a program executable with a computer, which can facilitate retrofit of the catalyst deterioration detecting apparatus for the existing engine system.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. In the following description, like reference characters designate like or corresponding parts throughout the several views.

Embodiment 1

Figure 1:
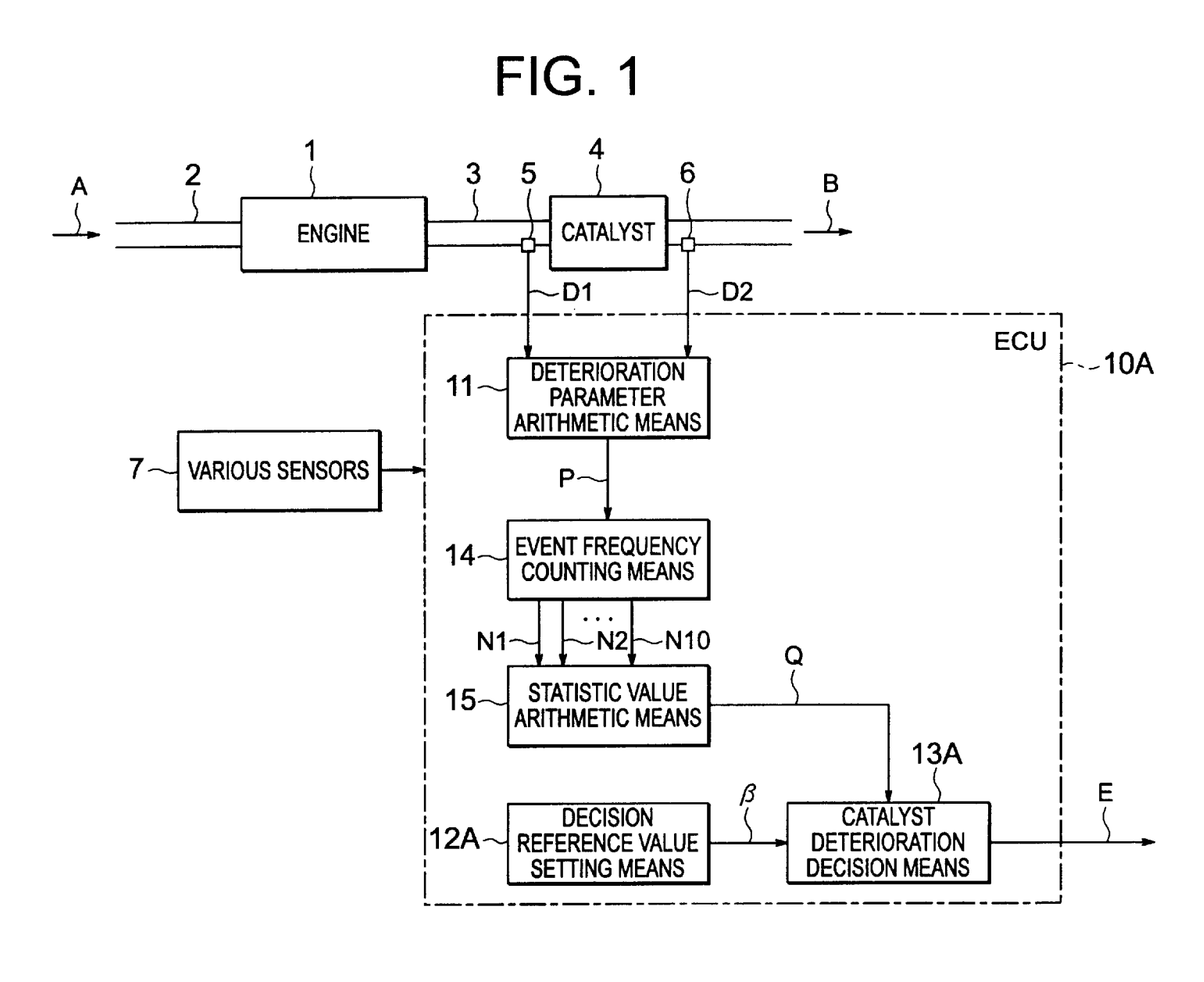
FIG. 1 is a block diagram showing schematically an arrangement of a catalyst deterioration detecting apparatus for an internal combustion engine according to a first embodiment of the present invention.

FIG. 1 is a functional block diagram showing schematically an arrangement of a catalyst deterioration detecting apparatus for an internal combustion engine system according to a first embodiment of the present invention. In the figure, like components as those described hereinbefore by reference to FIG. 6 are denoted by like reference symbols and detailed description thereof will be omitted.

Referring to FIG. 1, the catalyst deterioration detecting apparatus includes an ECU (Electronic Control Unit) 10A which in turn incorporates therein an event frequency counting means 14 and a statistic value arithmetic means 15 in addition to a deterioration parameter arithmetic means 11, a decision reference value setting means denoted by reference character 12A and a catalyst deterioration decision means denoted by 13A. The various means mentioned just above may be realized in the form of program(s) executable with the computer.

According to the teachings of the invention incarnated in the instant embodiment, the deterioration parameter arithmetic means 11 is so designed as to determine arithmetically at least one of the number of polarity inversions and the waveform areas of the first and second detection signals D1 and D2 as the first and second concerned values, respectively, and then determine arithmetically the deterioration parameter P as a quotient value obtained by dividing the second concerned value derived from the second detection signal D2 by the first concerned value derived from the first detection signal D1. In this conjunction, it may be presumed that the first detection signal D1 is derived from the output of the air-fuel ratio sensor disposed upstream of the catalytic converter with the second detection signal D2 being derived from the output of the air-fuel ratio sensor disposed downstream of the catalytic converter.

Figure 2:
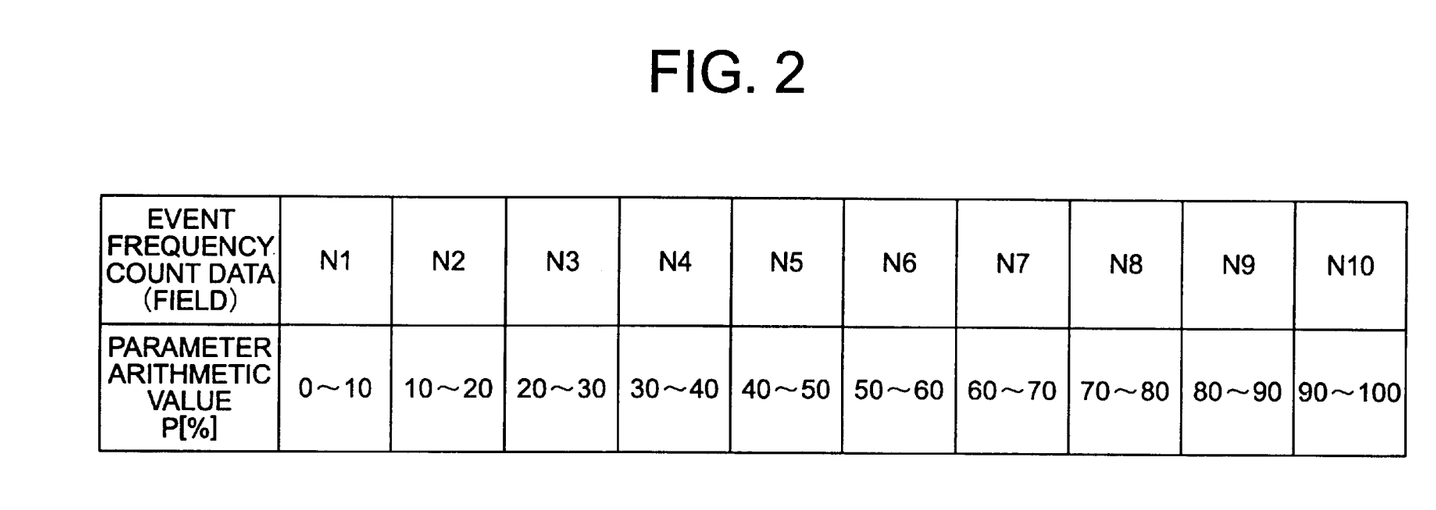
FIG. 2 is a view for illustrating, by way of example, a frequency distribution generated by a event frequency counting means incorporated in the catalyst deterioration detecting apparatus according to the first embodiment of the invention.

On the other hand, the event frequency counting means 14 may be so designed or programmed as to count occurrence of the deterioration parameter P (i.e., event) for registration or entry in each of a plurality of divided regions or fields in dependence on magnitude of the arithmetically determined value or quotient value of the deterioration parameter P mentioned above to thereby generate an event frequency distribution table containing e.g. ten event frequency count data fields N1 to N10 (refer to FIG. 2).

In more concrete, the event frequency counting means 14 is designated such that the whole range within which values of the deterioration parameter P can fall, i.e., the range extending from a minimum value (on the order of 0%) of the deterioration parameter P to a maximum value (100%) thereof, is divided into ten fields at a substantially equal interval (approximately every 10% of the maximum value of the deterioration parameter P), to thereby generate the event frequency count data N1 to N10 by counting the occurrence of the deterioration parameter P (events) discretely in each of the fields in dependence on the value of the deterioration parameter P.

Although it is assumed that the value range of the deterioration parameter P is divided into ten fields, the present invention is never restricted to any specific number of the divided regions or fields. It goes without saying that the range of the values which the deterioration parameter P can assure can be divided into a given number of fields on a case-by-case basis. In general, the number of fields (N) can be determined empirically.

At this juncture, it is however to be mentioned that the event frequency counting means 14 should be backed up such that the event frequency distribution data (data N1 to N10) can be sustained or held even after power-off of the engine system. In that case, the event frequency count data obtained before power-off can consecutively be utilized intactly and updated after the engine system is again put into operation.

The statistic value arithmetic means 15 is designed to compute a statistic value Q on the basis of the event frequency distribution (event frequency count data N1 to N10) obtained from the event frequency counting means 14. By way of example, the statistic value arithmetic means 15 can be so designed as to divide a sum of the event frequency count data in a given number of the data fields inclusive of the maximum value field (N10) by a sum of the event frequency count data in the remaining data fields inclusive of the minimum value field (N1) to thereby set the quotient value resulting from the division as the statistic value Q mentioned above.

The decision reference value setting means 12A can be so designed or programmed as to set a decision reference value β serving as the reference value for comparison with the statistic value Q.

Finally, the catalyst deterioration decision means 13A can be designed or programmed to make decision as to the deterioration of the catalyst on the basis of the statistic value Q. In more concrete, the catalyst deterioration decision means 13A compares the statistic value Q with the reference value β to thereby generate an abnormality signal E indicative of deterioration of the catalyst 4 when the statistic value Q is greater than the reference value β.

FIG. 2 is a view for illustrating, by way of example, an event frequency distribution generated by the event frequency counting means 14. As can be seen in the figure, the range extending from the minimum value (e.g. on the order of 0%) of the deterioration parameter P to the maximum value (100%) thereof is divided into ten regions or fields at the interval of about 10%, wherein ten event frequency count data N1 to N10 are distributed over the ten fields.

Figure 3:
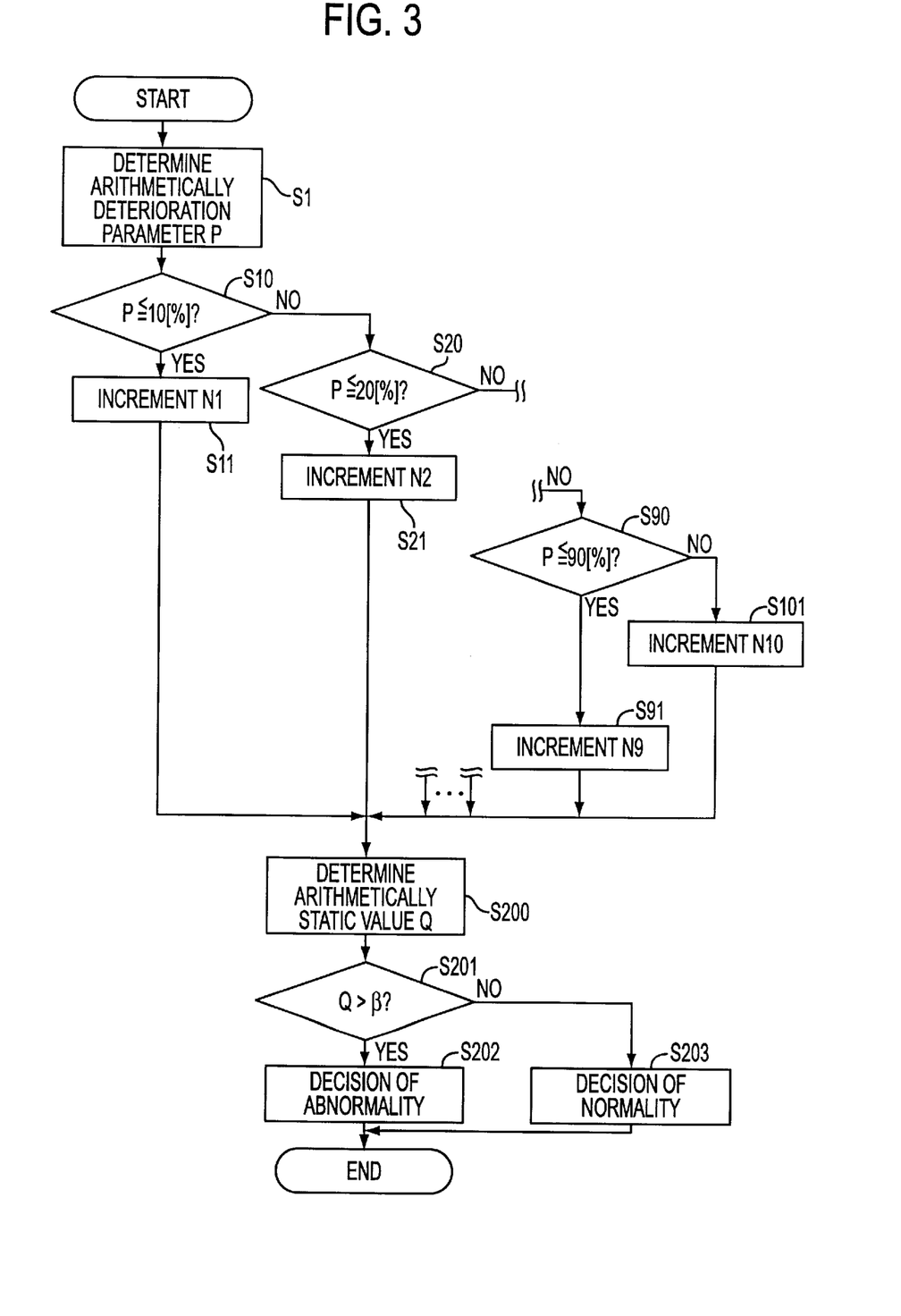
FIG. 3 is a flow chart for illustrating operation of the catalyst deterioration detecting apparatus according to the first embodiment of the invention.

Next, referring to the flow chart shown in FIG. 3, description will be directed to the operation of the catalyst deterioration detecting apparatus according to the instant embodiment of the invention.

In FIG. 3, the arithmetic processing for determining the deterioration parameter P (step S1 to step S101) is executed periodically in response to the first or second detection signal D1 or D2 sampled at a predetermined interval (every 10 msec or so).

Further, statistic value arithmetic processing and deterioration decision processing (step S200 to step S203) are executed by using the event frequency count data N1 to N10 stored accumulatively over a stable operation period (e.g. 2 seconds) which is determined by taking into account the manipulation of an accelerator pedal of the motor vehicle by the operator or driver.

Now, referring to FIG. 3, the deterioration parameter P is computed by the deterioration parameter arithmetic means 11 on the basis of the first and second detection signals D1 and D2 (step S1).

Subsequently, the event frequency counting means 14 decides in which field the arithmetically determined value (quotient value) of the deterioration parameter P outputted from the deterioration parameter arithmetic means 11 falls (steps S10, S20, ..., S90) to thereby increment the event frequency count data (see N1, N2, ... or N10) in the relevant field (steps S11, S21, S91, S101).

More specifically, in the step S10, decision is made as to whether the arithmetic value of the deterioration parameter P outputted from the deterioration parameter arithmetic means 11 is not greater than 10%. In the case where the condition that $P \leq 10\%$ is satisfied, i.e., when the decision step S10 results in affirmation "YES", the event frequency count data N1 in the field corresponding to the values on the order of 0% to 10% (minimum value field or range) of the deterioration parameter P shown in FIG. 2 is incremented in the step S11.

On the other hand, when it is decided in the step S10 that P>10% (i.e., when the decision step S10 results in negation "NO"), then decision is made whether the value of the deterioration parameter P is not greater than 20% (step S20). When the decision results in that $P \leq 20\%$ (i.e., when the decision step S20 results in affirmation "YES", the event frequency count data N2 in the field which corresponds to the values on the order of 10% to 20% of the deterioration parameter P is incremented (step S21).

In succession, similar arithmetic processing steps S30, S31, ..., steps S80; S81 (omitted from illustration) and steps S90; S91 and S101 are executed repetitively, whereby the event frequency count data N3 to N10 in the remaining fields are incremented correspondingly.

When the event frequency distribution which covers e.g. 2 seconds has been prepared after execution of the processing steps S1 to S101, the statistic value arithmetic means 15 then determines the statistic value Q in accordance with the following expression (1) in a step S200.

$$Q=(N7+N8+N9+N10)/(N1+N2+N3+\ldots+N10) \tag{1}$$

The statistic value Q determined in accordance with the expression (1) indicates a proportion occupied by the event frequency count data N7 to N10 (greater than 60% inclusive) in all the event frequency count data.

Certainly, the statistic value Q is preferably to be calculated in accordance with the above-mentioned expression (1). In general, however, the statistic value Q can be defined as the ratio or quotient obtained by dividing the event frequency count data covering those of the maximum value data field N10 by the event frequency count data covering those of the minimum value data field N1. In other words, any given value of the ratio defined above may be employed as the statistic value Q so long as the conditions for the catalyst deterioration decision can be satisfied. In general, the statistic value Q can empirically be determined on the basis of the above-mentioned definition.

In this conjunction, it should also be mentioned that the decision reference value setting means 12A is naturally so designed as to set the decision reference value β in conformance with the statistic value Q so that the decision reference value β can serve as the deterioration decision reference value with high reliability. Similarly, the decision reference value β can also be determined empirically.

The catalyst deterioration decision means 13A makes decision as to whether or not the statistic value Q is greater than the decision reference value β in a step S201. When it is decided that Q>β, i.e., when the decision step S201 results in affirmation "YES", then it is determined that the catalyst 4 is in the deteriorated state (abnormal state) in the step S202, whereupon an abnormality signal E (FIG. 1) is generated.

On the other hand, when it is decided that Q≦β in the step S201, i.e., when the decision step S201 results in negation "NO", then the catalyst 4 can be regarded as being min the normal state (step S203). Thus, the processing routine illustrated in FIG. 3 comes to an end.

As will now be appreciated, erroneous decision concerning the deterioration of the catalyst 4 which is ascribable to unexpected variations of the operating state as mentioned hereinbefore in conjunction with the conventional apparatus can positively be prevented by preparing the event frequency distribution (event frequency count data N1 to N10) based on the deterioration parameter P derived from the first and second detection signals D1 and D2 outputted from the air-fuel ratio sensors disposed upstream and downstream of the catalytic converter 4 and by making decision as to the deteriorated state of the catalyst 4 on the basis of the statistic value Q which in turn is arithmetically determined on the basis of the event frequency distribution.

Further, the frequency distribution determined by the event frequency counting means 14 can be backed up to be held valid even after the starting switch (power supply switch) for the engine 1 is turned off or opened. Thus, the frequency distribution determined before the starting switch is opened can be made use of immediately upon closing of the starting switch in the succeeding operation cycle.

In this conjunction, it should also be added that because the event frequency count data updated up to the time point at which the starting switch is opened is employed in the succeeding operation cycle, any adverse influence of momentary or transient change of the deterioration parameter P which may occur upon closing of the engine starting switch can be suppressed without fail.

Embodiment 2

In the case of the catalyst deterioration detecting apparatus according to the first embodiment of the invention, no consideration is paid to overflow of the event frequency count data generated and held by the event frequency counting means 14. Occurrence of overflow in any of the event frequency count data N1 to N10 is undesirable. Accordingly, the second embodiment of the invention is directed to the catalyst deterioration detecting apparatus which is arranged such that when overflow takes place in any of the event frequency count data N1 to N10, all the event frequency count data are compressed to thereby allow the counting to be carried out continuously.

Figure 4:
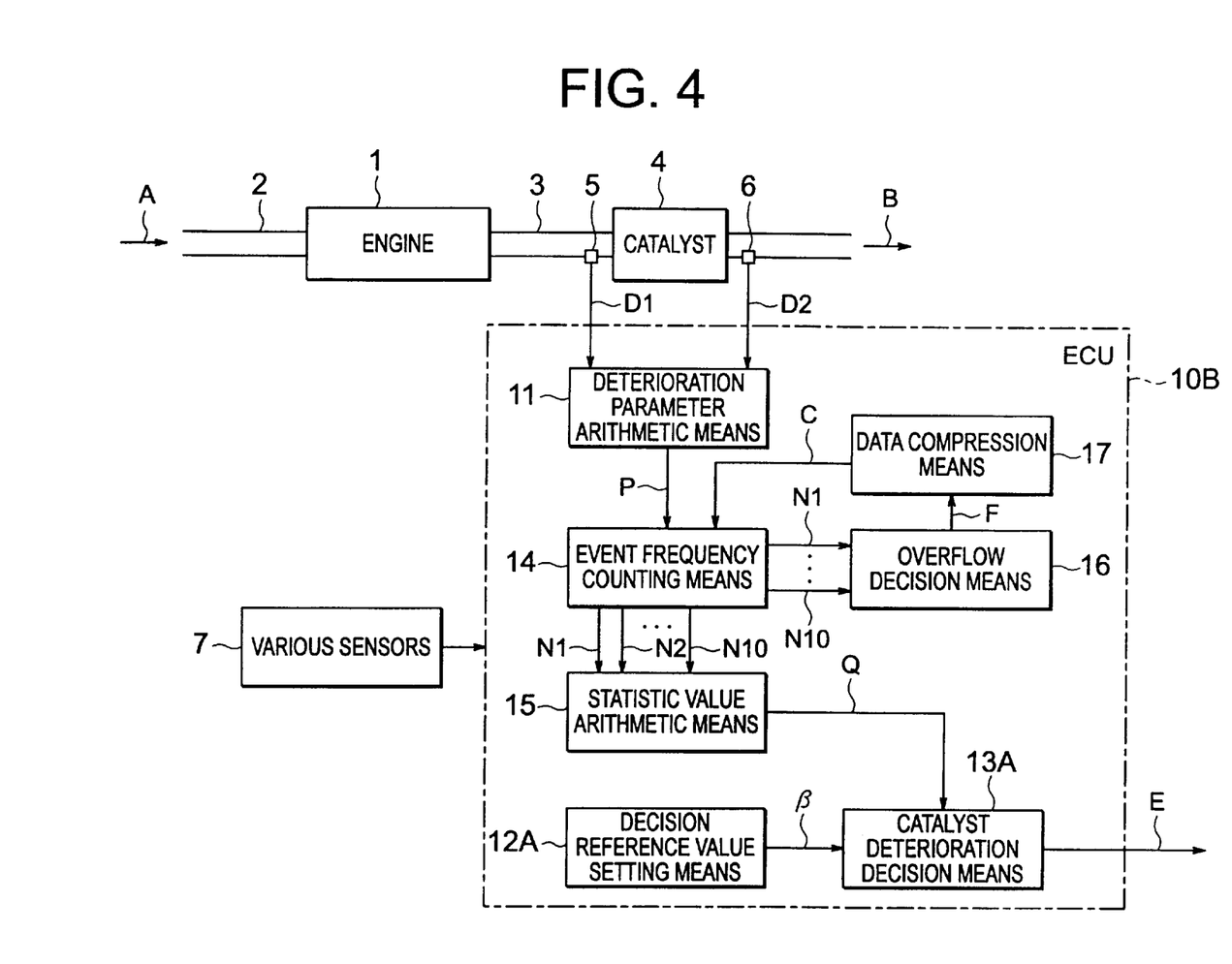
FIG. 4 is a block diagram showing schematically an arrangement of a catalyst deterioration detecting apparatus for an internal combustion engine according to a second embodiment of the present invention.

In the following, description will be made of the catalyst deterioration detecting apparatus for the internal combustion engine according to the second embodiment of the invention in which the event frequency count data is compressed upon occurrence of overflow. FIG. 4 is a block diagram showing schematically an arrangement of the catalyst deterioration detecting apparatus according to the second embodiment of the invention. In the figure, like components as those described previously by reference to FIG. 1 are denoted by like reference symbols and detailed description thereof will be omitted.

Referring to FIG. 4, the catalyst deterioration detecting apparatus includes an ECU (Electronic Control Unit) 10B which in turn incorporates therein an overflow decision means 16 and a data compression means 17 in addition to the deterioration parameter arithmetic means 11, the decision reference value setting means 12A, the catalyst deterioration decision means 13A, the event frequency counting means 14 and the statistic value arithmetic means 15. The various means mentioned above may be realized in the form of program(s) executable with the computer.

The overflow decision means 16 is arranged to generate an overflow decision signal F when overflow occurs in at least one of the event frequency count data N1 to N10. On the other hand, the data compression means 17 generates a data compression signal C in response to the overflow decision signal F, whereby all the event frequency count data N1 to N10 in all the distribution fields are compressed to e.g. one half.

Figure 5:
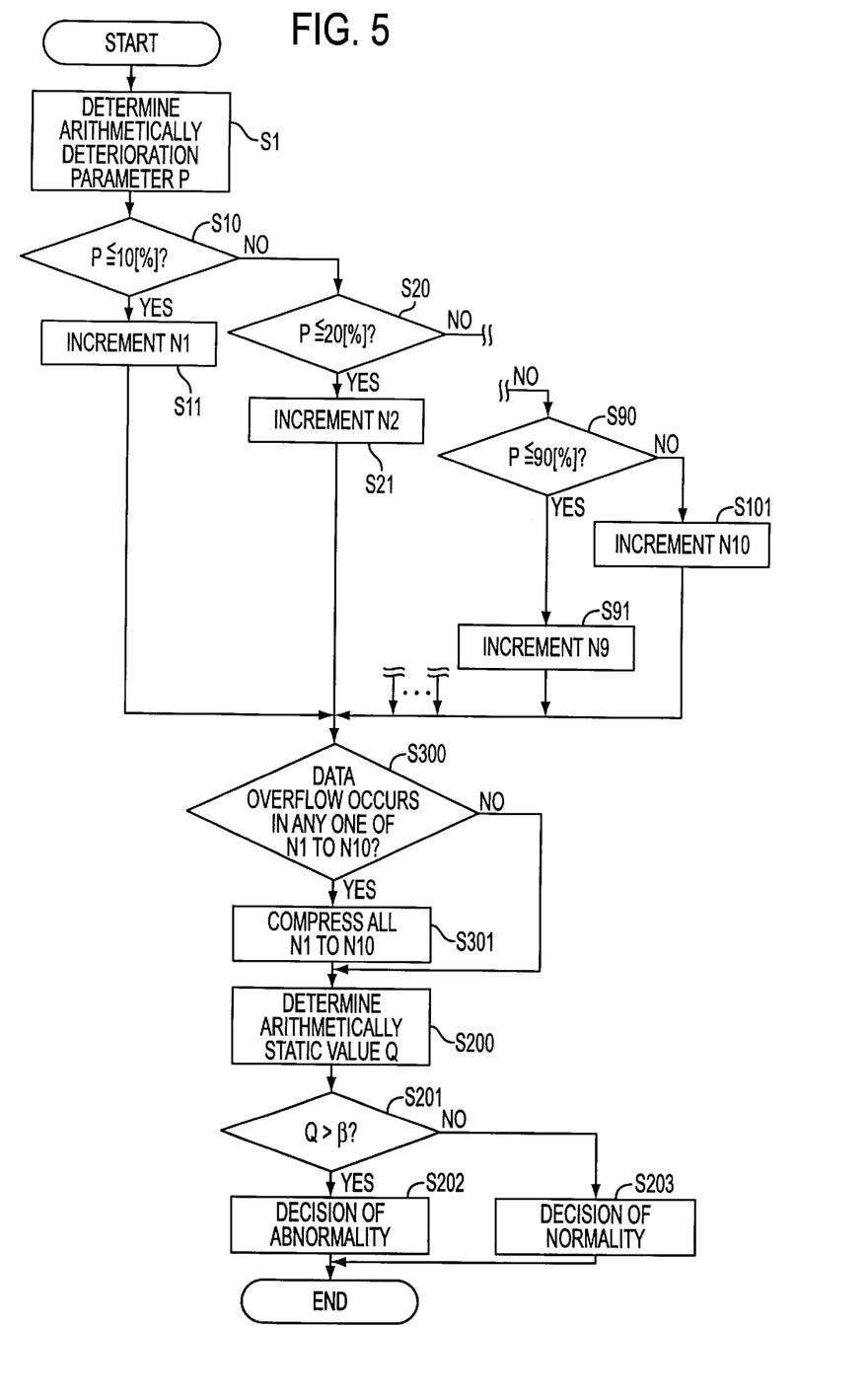
FIG. 5 is a flow chart for illustrating operation of the catalyst deterioration detecting apparatus according to the second embodiment of the invention.

Next, referring to the flow chart shown in FIG. 5, description will be made of operation of the catalyst deterioration detecting apparatus according to the second embodiment of the invention. Parenthetically, in FIG. 5, steps similar to those described-hereinbefore by reference to FIG. 3 are denoted by like reference characters and repeated description in detail thereof will be omitted.

In succession to execution of the event frequency distribution generation processing (steps S1 to S101) described previously, the overflow decision means 16 makes decision as to whether or not overflow occurs in any of the event frequency count data N1 to N10 by checking if the data has attained the maximum count value, e.g. "256" for the field capacity of one byte (step S300).

When it is decided that overflow has occurred in any one of the event frequency count data N1 to N10 (i.e., when the decision step S300 results in affirmation "YES"), all the event frequency count data N1 to N10 are compressed to one half (step S301), whereupon the processing proceeds to the statistic value (Q) computation step S200 mentioned previously.

On the other hand, when it is decided that overflow does not occur in any one of event frequency count data N1 to N10 (i.e., when the decision step S300 results in negation "NO"), the processing proceeds to the step S200 without execution of the data compression step S301.

In this way, overflow state can be canceled by compressing all the event frequency count data to one half whenever overflow has occurred in at least any one of the event frequency count data held in the event frequency counting means 14. Thus, the frequency distribution can be sustained continuously over an extended period with high accuracy and reliability independently of magnitude of the maximum count value.

Further, since the event frequency count data N1 to N10 are compressed simply to one half, the data compression processing can easily be carried out merely by shifting by one digit with the minimum binary bit being rounded off. Of course, the data compression rate for canceling the overflow is never restricted to "one half". In general, the compression rate can be given by $\frac{1}{2}^n$ where n represents a natural number.

Incidentally, the deterioration parameter P which indicates the degree of deterioration of the catalyst 4 may be arithmetically determined in accordance with $$P=PN2/PN1\times 100[\%] \quad (2)$$

where PN1 represents the number of times the polarity of the first detection signal D1 is inverted during a unitary time period, and PN2 represents the number of times the polarity of the second detection signal D2 is inverted during a unitary time period.

Many features and advantages of the present invention are apparent from the detailed description and thus it is intended by the appended claims to cover all such features and advantages which fall within the true spirit and scope of the invention. Further, since numerous modifications and combinations will readily occur to those skilled in the art, it is not intended to limit the invention to the exact construction and operation illustrated and described.

By way of example, although the present invention has been described in conjunction with the apparatus for detecting deterioration of the catalyst, teachings of the invention can be implemented as the methods typified by the flow charts in FIGS. 3 and 4 in the form of program or programs which can be executed with the computer such as microcomputer. Accordingly, it is intended that such methods, program(s) and a recording medium in which the program(s) is stored are to be covered by the present invention. Accordingly, all suitable modifications and equivalents may be resorted to, falling within the spirit and scope of the invention.

What is claimed is:

1. An apparatus for detecting deterioration of a catalyst provided in an exhaust pipe of an internal combustion engine system, comprising:

first air-fuel ratio sensor means provided upstream of said catalyst;

second air-fuel ratio sensor means provided downstream of said catalyst;

deterioration parameter arithmetic means for arithmetically determining a deterioration parameter for making decision as to deterioration of said catalyst on the basis of comparison between a first detection signal originating in said first air-fuel ratio sensor means and a second detection signal originating in said second air-fuel ratio sensor means;

event frequency counting means for counting occurrences of said deterioration parameter in each of plural distribution fields prepared in dependence on magnitudes of arithmetically determined values of said deterioration parameter as event frequency count data, respectively;

statistic value arithmetic means for arithmetically determining a statistic value on the basis of said event frequency count data in said distribution fields; and catalyst deterioration decision means for deciding whether said catalyst is deteriorated or not on the basis of said statistic value.

2. A catalyst deterioration detecting apparatus for an internal combustion engine system according to claim 1, wherein said deterioration parameter arithmetic means is so designed as to determine arithmetically at least one of the number of polarity inversions and waveform areas of said first and second detection signals as first and second concerned values, respectively, and then determine arithmetically as the arithmetically determined value of said deterioration parameter a value obtained by dividing said second concerned value derived from said second detection signal by said first concerned value derived from said first detection signal.

3. A catalyst deterioration detecting apparatus for an internal combustion engine system according to claim 1, wherein said event frequency counting means is so designed as to divide a whole range of deterioration parameter values extending from a minimum value to a maximum value thereof into a plurality of said distribution fields at a substantially equal interval to thereby count said number of occurrences of said deterioration parameter independently in each of said distribution fields.

4. A catalyst deterioration detecting apparatus for an internal combustion engine system according to claim 3, wherein said statistic value arithmetic means is so designed as to divide event frequency count data covering the maximum value as obtained from said event frequency counting means by event frequency count data covering said minimum value to thereby set a value resulting from the division as said statistic value.

5. A catalyst deterioration detecting apparatus for an internal combustion engine system according to claim 4, further comprising:

decision reference value setting means for setting a decision reference value serving as a reference value for comparison with said statistic value, wherein said catalyst deterioration decision means is so designed as to compare said statistic value with said decision reference value to thereby generate an abnormality signal indicative of deterioration of said catalyst when said statistic value exceeds said decision reference value.

6. A catalyst deterioration detecting apparatus for an internal combustion engine system according to claim 1, wherein said event frequency counting means is so arranged that said event frequency count data can be backed up for thereby holding said frequency distribution data even after power-off of said internal combustion engine system.

7. A catalyst deterioration detecting apparatus for an internal combustion engine system according to claim 1, further comprising:

overflow decision means for generating an overflow decision signal when overflow of the event frequency count data occurs in at least one of said distribution fields; and data compression means for compressing all the event frequency count data in all of said distribution fields in response to said overflow decision signal.

8. A catalyst deterioration detecting apparatus for an internal combustion engine system according to claim 7, wherein said data compression means is so designed as to compress all the event frequency count data in all of said distribution fields to $\frac{1}{2}^N$ (n: a natural number) in response to said overflow decision signal.

9. A method of detecting deterioration of a catalyst provided in an exhaust pipe of an internal combustion engine system, said method comprising the steps of:

detecting a first air-fuel ratio at a location upstream of said catalyst within said exhaust pipe;

detecting a second air-fuel ratio at a location downstream of said catalyst within said exhaust pipe;

determining arithmetically a deterioration parameter for decision as to deterioration of said catalyst on the basis of comparison between said first air-fuel ratio and said second air-fuel ratio;

counting occurrences of said deterioration parameter in each of plural distribution fields prepared in dependence on magnitudes of arithmetically determined values of said deterioration parameter as event frequency count data, respectively;

determining arithmetically a statistic value on the basis of said event frequency count data in said distribution fields; and deciding whether said catalyst is deteriorated or not on the basis of said statistic value.

10. A recording medium storing a method of detecting deterioration of a catalyst provided in an exhaust pipe of an internal combustion engine system in the form of a computer-executable program, said program comprising the statements of:

detecting a first air-fuel ratio at a location upstream of said catalyst within said exhaust pipe;

detecting a second air-fuel ratio at a location downstream of said catalyst within said exhaust pipe;

determining arithmetically a deterioration parameter for decision as to deterioration of said catalyst on the basis of comparison between said first air-fuel ratio and said second air-fuel ratio;

counting occurrences of said deterioration parameter in each of plural distribution fields prepared in dependence on magnitudes of arithmetically determined values of said deterioration parameter as event frequency count data, respectively;

determining arithmetically a statistic value on the basis of said event frequency count data in said distribution fields; and deciding whether said catalyst is deteriorated or not on the basis of said statistic value.

* * * * *